United States Patent
Cao et al.

(10) Patent No.: US 9,654,242 B2
(45) Date of Patent: May 16, 2017

(54) NODE AND METHOD FOR SELECTING SYNCHRONIZATION SOURCE

(71) Applicant: Telefonaktiebolaget L M Ericsson (publ), Stockholm (SE)

(72) Inventors: Jin Cao, Beijing (CN); Rui Lin, Beijing (CN); Yanxing Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 25 days.

(21) Appl. No.: 14/783,999

(22) PCT Filed: Apr. 18, 2013

(86) PCT No.: PCT/CN2013/074356
§ 371 (c)(1),
(2) Date: Oct. 12, 2015

(87) PCT Pub. No.: WO2014/169458
PCT Pub. Date: Oct. 23, 2014

(65) Prior Publication Data
US 2016/0065322 A1    Mar. 3, 2016

(51) Int. Cl.
*H04J 3/06* (2006.01)
*H04W 56/00* (2009.01)

(52) U.S. Cl.
CPC .......... *H04J 3/0641* (2013.01); *H04J 3/0658* (2013.01); *H04J 3/0679* (2013.01); *H04W 56/0015* (2013.01)

(58) Field of Classification Search
CPC .............. H04W 56/00; H04W 56/001; H04W 56/0015; H04J 3/0641; H04J 3/0638; H04J 3/0632; H04J 3/0679; H04J 3/0685
(Continued)

(56) References Cited

U.S. PATENT DOCUMENTS 6,990,517 B1 *  1/2006  Bevan ................... H04J 3/0679
                                                              709/223
8,201,015 B2 *  6/2012  Grah ......................... G06F 1/10
                                                              713/500
(Continued)

FOREIGN PATENT DOCUMENTS

CN       101465707 A      6/2009
CN       101986595 A      3/2011

OTHER PUBLICATIONS

Unknown, Author, "Architecture and Requirements for Packet Based Frequency Delivery", ITU-T G.8265/Y.1365 (Oct. 2010), Series G: Transmission Systems and Media, Digital Systems and Networks, Packet Over Transport Aspects—Quality and Availability Targets, Series Y: Global Information Infrastructure, Internet Protocol Aspects and . . . , Oct. 2010, pp. 1-14.
(Continued)

*Primary Examiner* — Afsar M Qureshi
(74) *Attorney, Agent, or Firm* — Murphy, Bilak & Homiller, PLLC

(57) ABSTRACT

The disclosure relates to a node capable of selecting a first port to receive a first synchronization source in a system comprising a plurality of nodes. The node comprises a memory configured to memorize states of each port of the node in a corresponding tree. At least one tree is formed with ports of the plurality of connected nodes according to a second synchronization protocol. The node further comprises a first synchronization source selection unit configured to select the first port according to states of the ports of the node. The first synchronization source so selected will not form a loop in the network. There is also provided a method used in the node.

22 Claims, 7 Drawing Sheets

(58) Field of Classification Search
USPC .......................................................... 370/503
See application file for complete search history.

(56) References Cited

U.S. PATENT DOCUMENTS

| | | | | |
|---|---|---|---|---|
| 2011/0158120 | A1* | 6/2011 | Hamasaki | H04J 3/0641 370/252 |
| 2011/0249688 | A1* | 10/2011 | Liu | H04W 56/002 370/503 |
| 2012/0250704 | A1* | 10/2012 | Yamada | H04J 3/0661 370/503 |
| 2012/0287948 | A1* | 11/2012 | Ruffini | H04J 3/0658 370/503 |
| 2015/0009949 | A1* | 1/2015 | Khoryaev | H04W 48/16 370/330 |

OTHER PUBLICATIONS

Unknown, Author, "Architecture of Transport Networks Based on the Synchronous Digital Hierarchy (SDH)", ITU-T G.803 (Mar. 2000), Series G: Transmission Systems and Media, Digital Systems and Networks, Digital Transmission Systems—Digital Networks—General Aspects, Mar. 2000, pp. 1-59.

Unknown, Author, "Definitions and Terminology for Synchronization in Packet Networks", ITU-T G.8260 (Feb. 2012), Series G: Transmission Systems and Media, Digital Systems and Networks, Packet Over Transport Aspects—Quality and Availability Targets, Feb. 2012, pp. 1-42.

Unknown, Author, "Distribution of Timing Information Through Packet Networks", ITU-T G.8264/Y.1364 (Oct. 2008), Series G: Transmission Systems and Media, Digital Systems and Networks, Packet Over Transport Aspects—Quality and Availability Targets, Series Y: Global Information Infrastructure, Internet Protocol Aspects and . . . , Oct. 2008, pp. 1-36.

Unknown, Author, "IEEE Standard for a Precision Clock Synchronization Protocol for Networked Measurement and Control Systems", IEEE Instrumentation and Measurement Society, IEEE Std 1588, Jul. 24, 2008, pp. 1-289.

Unknown, Author, "Precision Time Protocol Telecom Profile for Frequency Synchronization", ITU-T G.8265.1/Y.1365.1 (Oct. 2010), Series G: Transmission Systems and Media, Digital Systems and Networks, Packet Over Transport Aspects—Quality and Availability Targets, Series Y: Global Information Infrastructure, Internet Protocol Aspects and . . . , Oct. 2010, pp. 1-14.

Unknown, Author, "Synchronization Layer Functions", ITU-T G.781 (Sep. 2008), Series G: Transmission System and Media, Digital Systems and Networks; Digital Terminal Equipments—Principal Characteristics of Multiplexing Equipment for the Synchronous Digital Hierarchy, Sep. 2008, pp. 1-124.

Unknown, Author, "Time and Phase Synchronization Aspects of Packet Networks", ITU-T G.8271/Y.1366 (Feb. 2012), Series G: Transmission Systems and Media, Digital Systems and Networks, Packet Over Transport Aspects—Quality and Availability, Series Y: Global Information Infrastructure, Internet Protocol Aspects and Next-Generation . . . , Feb. 2012, pp. 1-32.

Unknown, Author, "Timing and Synchronization Aspects in Packet Networks", ITU-T G.8261/Y.1361 (Apr. 2008) Series G: Transmission Systems and Media, Packet Over Transport Aspects—Quality and Availability Targets, Series Y: Global Information Infrastructure, Internet Protocol Aspects and Next-Generation Networks, Internet Protocol, Apr. 2008, pp. 1-112.

Unknown, Author, "Timing Characteristics of Synchronous Ethernet Equipment Slave Clock (EEC)", ITU-T G.8262/Y.1362 (Aug. 2007), Series G: Transmission Systems and Media, Digital Systems and Networks, Packet Over Transport Aspects—Quality and Availability Targets, Series Y: Global Information Infrastructure, Internet Protocol Aspects and . . . , Aug. 2007, pp. 1-36.

Unknown, Author, "Timing Loop Detection/Avoiding by ESMC Extension and Link Ring Protection Protocols in SyncE Network", Research Disclosure, Certified Document, The Industry Standard Disclosure Publication Service, Database No. 585012, Dec. 4, 2012, pp. 1-10.

* cited by examiner

NODE AND METHOD FOR SELECTING SYNCHRONIZATION SOURCE

TECHNICAL FIELD

The present disclosure relates to a synchronization technology, and more particularly, to a node and method for selecting a synchronization source.

BACKGROUND

Unless otherwise indicated herein, the approaches described in this section are not prior art to the claims in this disclosure and are not admitted to be prior art by inclusion in this section.

Conventionally, networks are deployed in tiered architectures utilizing a variety of transport media, e.g., optical filer, wireless, coaxial cable, twisted pair, etc., and layers. Most networks are evolving to use Ethernet as a dominant transmission protocol, such as Gigabit Ethernet (GE), 10-Gigabit Ethernet (10GE) and other Ethernet variants. Ethernet is inherently asynchronous. More modern versions of Ethernet can be synchronous (Synchronous Ethernet referred to herein as "Sync-E"), at the physical level (i.e., International Telecommunication Unit Telecommunication Standardization Section (ITU-T) G.826x series of standards such as g.8261, g.8264). However, when building a useful network based on the Sync-E specifications, there is potential timing loop in the network when the topology of the network is complex. There are some research been done or on going to do with the timing loop. The current solutions, however, can only avoid the potential timing loop, or detect an existed timing loop. There is no way to automatically configure a new synchronization source without a timing loop. In order to avoid the timing loop, the user needs to manually configure the network, which heavily burdens the user.

SUMMARY

An object of the disclosure is to provide a node and a method for selecting a synchronization source automatically, which can effectively avoid the timing loop in the network.

According to a first aspect, there is provided a node capable of selecting a first port to receive a first synchronization source in a system comprising a plurality of nodes. The plurality of nodes are connected to each other via ports of the nodes. The first synchronization source is associated with a first synchronization protocol different from a second synchronization protocol used in the system. The node comprises a memory and a first synchronization source selection unit. The memory is configured to memorize states of each port of the node in a corresponding tree of at least one tree in the system. The at least one tree is formed with ports of the plurality of connected nodes according to the second synchronization protocol. The first synchronization source selection unit is configured to select the first port to receive the first synchronization source based on states of the ports of the node.

Preferably, the first synchronization source is a frequency synchronization source, such as a Sync-E related protocol.

Preferably, the first synchronization protocol is a packet synchronization related protocol.

Preferably, the second synchronization protocol is a time or phase synchronization related protocol, such as IEEE 1588v2 protocol.

Preferably, the node further comprises a timing loop detection unit. The timing loop detection unit is configured to detect a timing loop regarding the first synchronization source in the system if a port of the node other than the first port is configured to receive the first synchronization source.

Preferably, the first synchronization source selection unit is configured to select a new port as the first port to receive the first synchronization source based on states of its ports if the timing loop detection unit detects a timing loop in the system.

Preferably, the first port is in state "slave".

Preferably, each of the at least one tree belongs to a different domain, and each port in a tree has the same domain number as the tree it belongs to.

Preferably, the first synchronization source selection unit is configured to select one of the ports as the first port based on the Quality Level (QL) of multiple candidate first synchronization sources received at the ports and the domain numbers of the ports.

Preferably, if more than one port has the best QL, the first synchronization source selection unit is configured to select the one whose domain number is closest to one tree of said at least one tree which is active in the system for a second synchronization source, the second synchronization source being associated with the second synchronization protocol.

Preferably, the timing loop detection unit is configured to detect a timing loop by using an extension Ethernet Synchronization Message Channel (ESMC) packet, which contains a domain number of a port which it passes through.

According to a second aspect, there is provided a method for selecting a first port of a node to receive a first synchronization source in a system comprising a plurality of nodes. The plurality of nodes are connected to each other via ports of the nodes. The first synchronization source is associated with a first synchronization protocol different from a second synchronization protocol used in the system. The method comprises a step of memorizing states of each port of the node in a corresponding tree of at least one tree in the system. The at least one tree is formed with ports of the plurality of connected nodes according to the second synchronization protocol. The method further comprises a step of selecting the first port to receive the first synchronization source based on states of the ports of the node.

According to the disclosure, a tree-structured master-slave hierarchy is established in advance by negotiation among nodes according to the second synchronization protocol. Accordingly, an auto-configuration of the first synchronization source is allowed by the node selecting its first synchronization source based on states of its ports. Furthermore, there is no loop formed in the tree which is established according to the second synchronization protocol. Accordingly, the first synchronization source selected in the nodes of the network according to the states of ports in the tree will not form a loop. The disclosure is also compatible with the current usage, where a user is allowed to manually configure the port used to receive the first synchronization source. If a timing loop is detected in the network, the node will re-select a port to receive the first synchronization source according to states of the ports of the node. The timing loop caused by the manual operation thus may be broken.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE EMBODIMENTS

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

The Sync-E protocol is good at the frequency synchronization. IEEE 1588v2 [see Reference 1, IEEE 1588 2008-Protocol, "IEEE Standard for a Precision Clock Synchronization Protocol for Networked Measurement and Control Systems," 2008] has been ratified by the IEEE in March 2008 and has been designed to overcome the inadequacies of previous solutions such as accuracy, scalability and cost. As described herein, IEEE 1588v2 is used to refer to IEEE 1588v2-2008 Precise Time Protocol (PTP) standards and any variations thereof.

The PTP standard specifies a clock synchronization protocol. This protocol is applicable to distributed systems consisting of one or more nodes, communicating over a network. Nodes are modelled as containing a real-time clock that may be used by applications within the node for various purposed such as generating timestamps for data or ordering events managed by the node. The protocol provides a mechanism for synchronizing the clocks of participating nodes to a high degree of accuracy and precision. The protocol is a distributed protocol that specifies how the real-time clocks in the system synchronize with each other. A tree-structured master-slave hierarchy will be formed by negotiation among nodes. The clock at the top of the hierarchy determines the reference time for the entire system. The synchronization is achieved by exchanging PTP timing messages, with the slaves using the timing information to adjust their clocks to the time of their master in the hierarchy. The protocol executes within a logical scope called a domain. All PTP messages, data sets, state machines, and all other PTP entities are always associated with a particular domain. A given physical network and individual devices connected to the network can be associated with multiple domains.

Exemplary Network Configuration and Operation

Figure 1:
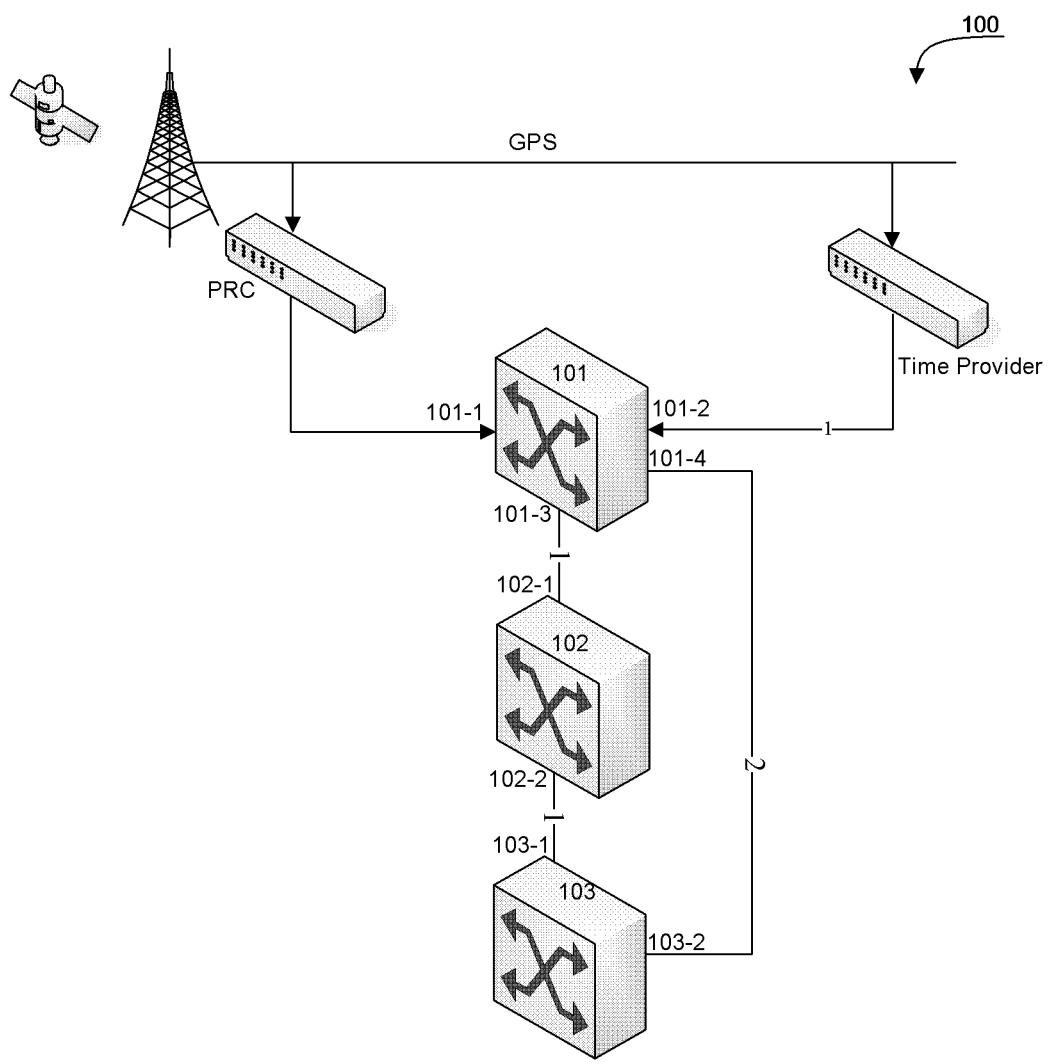
FIG. 1 illustrates a diagram of a network where the present invention may be implemented.

Referring now to FIG. 1, a diagram of a network 100 where the present invention may be implemented will be discussed. As shown, the network 100 comprises a Primary Reference Clock (PRC) and a time provider which obtain precise time information from a Global Positioning System (GPS) satellite. The network further comprises three nodes, denoted as 101~103. The solid line shown in FIG. 1 illustrates the physical connections among the nodes.

When applying the Sync-E protocol, node 101 is the time reference, i.e., time source of the node 102, which in turns acts as the time source of the node 103. If the connections from node 101 to the PRC and to the Time Provider are disconnected, a timing loop may occur in the network if node 101 now takes node 103 as its time reference.

Figure 2:
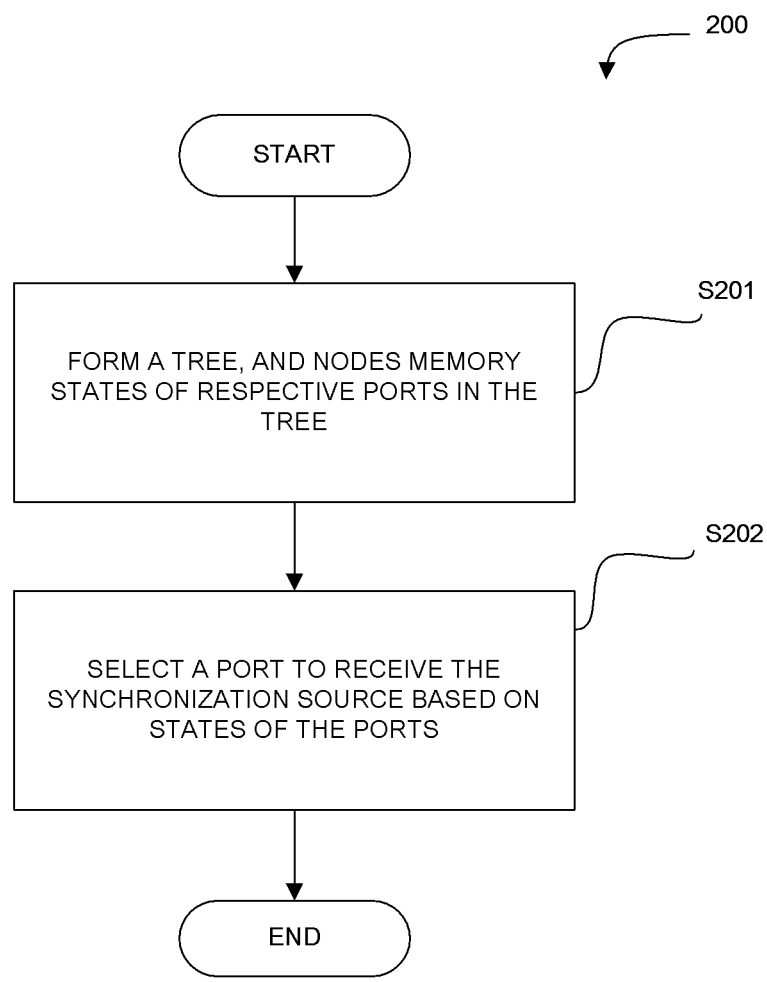
FIG. 2 shows a flowchart of a method used in a node for selecting a port to receive a first synchronization source according to an embodiment of the present invention.

FIG. 2 shows a flowchart of a method 200 used in a node for selecting a port to receive a first synchronization source according to an embodiment of the disclosure. The first synchronization source may be for example Sync-E synchronization source, which is associated with a first synchronization protocol, for example Sync-E protocol.

The method 200 starts at step 201, where at least one tree is formed among nodes in the network according to a second protocol (such as IEEE 1588v2 protocol) which is different from the first synchronization protocol, and the nodes in the network memory states of their respective ports in a corresponding tree. At step 202, a node in the network selects a port to receive the first synchronization source based on states of the ports. Accordingly, an automatic selection of the first synchronization source is enabled in the network.

Below it is described in detail by taking the first synchronization protocol being Sync-E protocol, the second synchronization protocol being IEEE 1588v2 protocol as an example.

At the beginning, as shown in FIG. 1, the nodes in the system are connected to each other via ports of the nodes. That is, Node 101 connects to the PRC at Port 101-1, to the time provider at Port 101-2, to Node 102 at Port 101-3, and to Node 103 at Port 101-4. Node 102 connects to Port 101-3 at Port 102-1, and to Node 103 at Port 102-2. Node 103 connects to Port 102-2 at Port 103-1, and to Port 101-4 at Port 103-2.

At step 201, at least one tree is formed according to IEEE 1588v2 protocol, and the nodes in the network memory states of their respective ports in a corresponding tree. At step 202, a node in the network selects a port to receive the Sync-E synchronization source based on states of the ports.

Returning back to FIG. 1, two trees are formed according to the topology of the network, the first one relating to ports 101-2, 101-3, 102-1, 102-2, 103-1, and the second one relating to ports 103-2 and 101-4. Each tree has a domain number different from each other. For example, it is assumed that the first and second trees have domain numbers of 1 and 2, respectively, which are denoted by the numbers shown on the lines connecting between the ports. The states of respective ports are illustrated as table 1 below.

TABLE 1 states of respective ports

| Node | Port | Domain | State |
|------|-------|--------|--------|
| 101 | 101-2 | 1 | Master |
|  | 101-3 | 1 | Master |
|  | 101-4 | 2 | Master |
| 102 | 102-1 | 1 | Slave |
|  | 102-2 | 1 | Master |
| 103 | 103-1 | 1 | Slave |
|  | 103-2 | 2 | Slave |

The nodes 101-103 select their ports to receive the Sync-E synchronization source based on states of their ports. It is preferable that the selected port is in state "slave." Accordingly, Node 102 will select Port 102-1 to receive the Sync-E synchronization source, and Node 103 will select one of Port 103-1 and Port 103-2 to receive the Sync-E synchronization source. As for Node 101, it will not take Node 103 as its Sync-E reference because Node 101-4 via which Node 101 connects to Node 103 is in state "master." Accordingly, no timing loop will occur in the network.

In the network according to the present invention, a user is allowed to manually configure the node. However, the user maybe not aware of the Sync-E source configuration in the network and the topology of the network, and his/her manual operation may incur a timing loop in the network.

Figure 3:
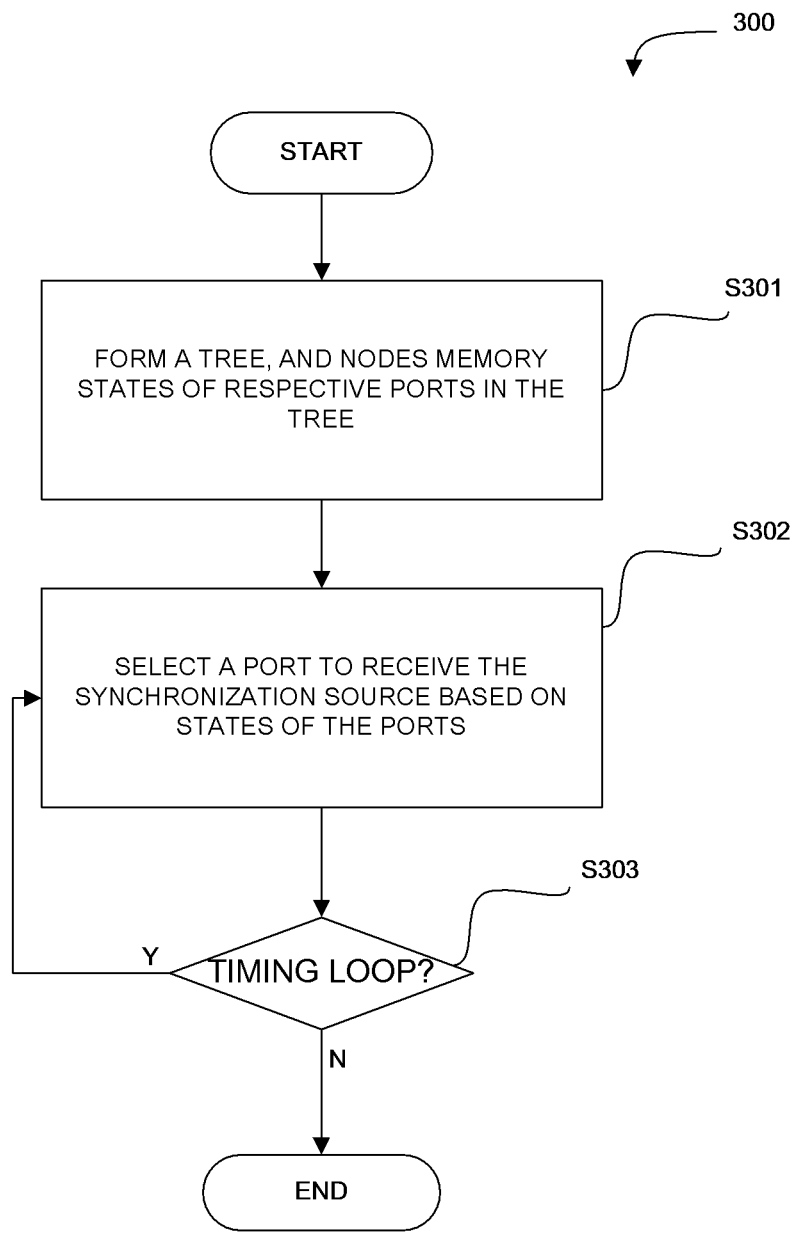
FIG. 3 shows a flowchart of a method for selecting a port to receive Sync-E synchronization source according to an embodiment of the disclosure.

FIG. 3 shows a flowchart of a method 300 for selecting a port to receive Sync-E synchronization source according to an embodiment of the disclosure.

The method 300 according to the embodiment is similar to the method 200. Steps S301 and S302 correspond to step S201 and S202, respectively, used to configure the network with the Sync-E synchronization source. The method 300 further comprises step 303, in which it is detected whether there is a timing loop in the network.

For example, if a user of Node 101 configures Port 101-4 instead of Port 101-1 to receive the Sync-E synchronization source, a timing loop occurs among Node 101, Node 102 and Node 103. If a timing loop occurs in the network, the method turns to step S302 to re-select the appropriate ports for receiving the Sync-E synchronization source based on the states of respective ports. Accordingly, the timing loop will be broken.

Figure 4:
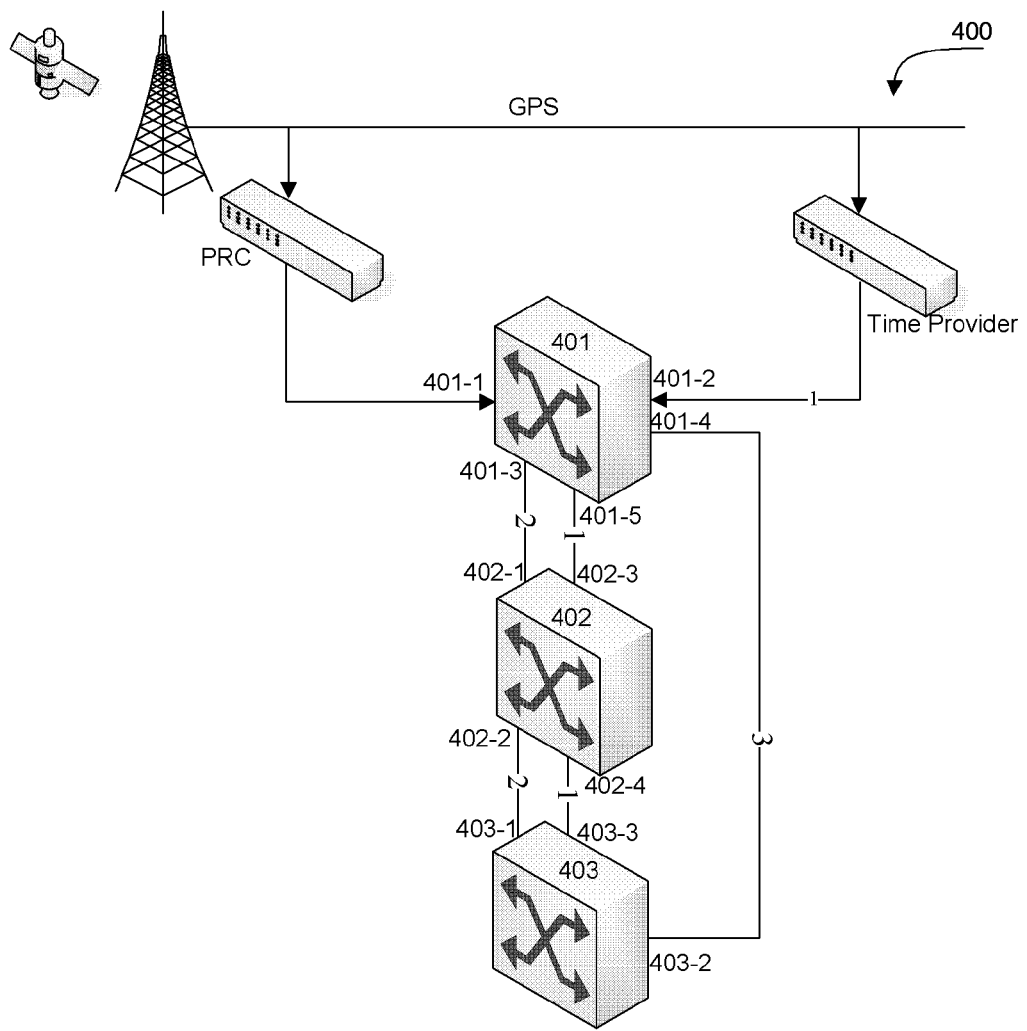
FIG. 4 shows a diagram of a network according to an embodiment of the disclosure.

FIG. 4 shows a diagram of a network 400 according to an embodiment of the disclosure.

Similar to the network 100 shown in FIG. 1, the network 400 comprises three nodes, 401-403. The connections among the nodes are also similar to those shown in FIG. 1, except that one more physical connection among the nodes is established.

Trees are formed according to the topology of the network in the network. The states of respective ports in corresponding trees are illustrated as table 2 below.

TABLE 2 states of respective ports

| Node | Port | Domain | State |
|---|---|---|---|
| 401 | 401-3 | 2 | Master |
|  | 401-4 | 3 | Master |
|  | 401-5 | 1 | Master |
| 402 | 402-1 | 2 | Slave |
|  | 402-2 | 2 | Master |
|  | 402-3 | 1 | Slave |
|  | 402-4 | 1 | Master |
| 403 | 403-1 | 2 | Slave |
|  | 403-2 | 3 | Slave |
|  | 403-3 | 1 | Slave |

Three trees are formed, the first one relating to ports 401-2, 401-5, 402-3, 402-4 and 403-3, the second one relating to ports 401-3, 402-1, 402-2 and 403-1, and the third one relating to ports 403-2 and 401-4. Each tree has a domain number different from each other. For example, it is assumed that the first, second and third trees have domain numbers of 1, 2 and 3, respectively, which are denoted by the numbers shown on the lines connecting between the ports.

Node 401 gets its time from the Time provider, and gets its Sync-E frequency clock from the PRC. Only one tree is active for the time or phase source in the system. Accordingly, domain 1 is used for the time or phase synchronization source in the network. That is, Node 402 takes the time synchronization source received at port 402-3 from port 401-5 as the reference. Node 403 takes the time synchronization source received at port 403-3 from port 402-4 as the reference. For Node 401, the three domains are configured on different three Ethernet ports. All the ports on Node 401 are staying in "Master" state. For Node 402, two domains are configured on four ports. There should be only one "slave" port in each domain in the same node. When selecting the Sync-E synchronization sources, i.e., the port to receive the reference Sync-E synchronization source, Node 402 will look at states of respective ports. As shown in FIG. 4, both ports 402-1 and 402-3 are in state "slave." Node 402 may select the port to receive the Sync-E synchronization source based on Quality Level (QL) of the Sync-E synchronization sources received at the two ports, and based on the domain number values of the two ports. If one port has a higher QL than the other one, Node 402 may select the one having a higher QL as the port to receive the Sync-E synchronization source, i.e., select the Sync-E synchronization source of a higher QL. If the Sync-E synchronization sources received at the two ports have the same QL, Node 402 may select the one whose domain number is closest to a tree which is active in the network for a second synchronization source (e.g., time synchronization source in the embodiment) associated with the second synchronization protocol (e.g., IEEE 1588v2 protocol in the embodiment) domain number of the time synchronization source in the network. The second synchronization source may be a time synchronization source, and the Sync-E synchronization source is a frequency synchronization source. Accordingly, it is better if the frequency synchronization source and the time synchronization source come from the same source. Accordingly, Node 402 will select port 402-3 to receive the Sync-E synchronization source, i.e., it takes the Sync-E synchronization source received at port 402-3 as the reference. What shall be noted is that port 402-3 may be not Sync-E compliant. In such case, Node 402 may select port 402-1 to receive the Sync-E synchronization source, whose domain number "2" is close to the domain number "1" of the time synchronization source.

Similarly, Node 403 may select one of Port 403-1 and Port 403-3 to receive the Sync-E synchronization source. There may be the case where Node 402 selects Port 402-1 while Node 403 selects Port 403-3 to receive their Sync-E synchronization sources. For the PTP domain, only one tree is active in the network. For the Sync-E domain, there may be more than one domain active in the network.

In the network 400, Node 402 may receive both the Sync-E synchronization source and the time synchronization source. It works in a hybrid mode in such a case. "Hybrid" used herein refers to the case where a node receive both the Sync-E synchronization source and the time synchronization source. For a node operating in the hybrid mode, it selects its Sync-E synchronization source according to the state machine of the 1588v2 protocol. The Sync-E synchronization source is a frequency synchronization source, the 1588v2 synchronization source is a time synchronization source. It is better that if the frequency source and the time source come from the same source. Accordingly, it is preferable that a Sync-E synchronization source closest to the 1588v2 source is selected.

Time synchronization includes frequency synchronization and phase or time synchronization. The accuracy purely adopting IEEE 1588v2 standard can reach 50 ns. If a synchronous Ethernet technology is implemented by combining IEEE 1588v2 and Sync-E technology together, the accuracy of the timing system can be improved. Accordingly, a node operating in a "hybrid" mode may have a more accurate time than a node using only one of the Sync-E source or IEEE 1588v2 source.

Sync-E uses the physical layer interface to pass timing from node to node in the same way timing is passed in SONET/SDH or T1/E1. Sync-E is a PHY-Level frequency distribution that is achieved through the Ethernet port. The method requires a Primary Reference Clock (PRC) feeding the Ethernet network. 1588v2 is a packet based protocol. Accordingly, a node may receive both a Sync-E synchronization source and a time or phase synchronization source at one and the same port.

Exemplary Warning Mechanism

In order to be compatible with the current usage, it is allowed to configure a port not in state "slave" to receive the Sync-E synchronization source. It is proposed a warning mechanism for alerting such case. For example, if a port of a node in one of mater, passive, listening, uncalibrated, initializing, faulty, or disabled is selected as the port to receive the Sync-E synchronization source, a warning is displayed on the node. If there is detected a timing loop in the network, a timer starts. When the timer is running, the node having "warning" displayed thereon starts to re-select an appropriate port to receive Sync-E synchronization source according the embodiments of the disclosure, i.e., select a port in state "slave." If the timing loop disappears after the re-selection of the port, the timer ends. If the timer exceeds a predetermined threshold and the timing loop still happens, a fatal error is shown to the user.

There are several ways to detect a timing loop in the network. It is proposed an extension Ethernet Synchronization Message Channel (ESMC) packet used to detect a timing loop in Reference 2 ["Timing Loop Detection/Avoiding by ESMC Extension and Link Ring Protection Protocols in SyncE Network", http://www.rdjournal.co.uk/rd/free/RD585012.pdf]. The extension ESMC packet is passed from a node to a downstream node, the upstream node adds its ID to the ESMC PDU Node list. When a node finds its own ID in the Node list, it is determined that a timing loop occurs. When using the extension ESMC packet to detect the timing loop in the embodiment, the node may be configured to add the domain number of the port from which the extension ESMC packet is transmitted. Accordingly, the following nodes may determine the domains of the upstream nodes, and make appropriate selection based on the determination.

Exemplary Node Configuration

Figure 5:
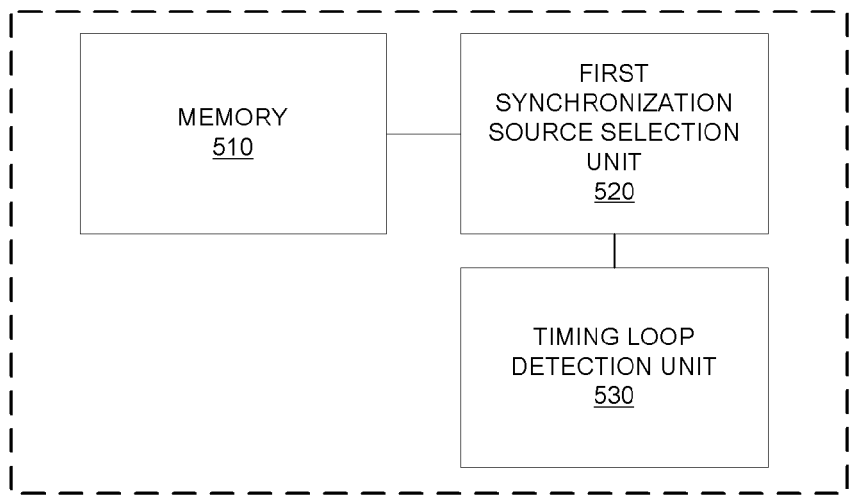
FIG. 5 shows a diagram of a node according to an embodiment of the disclosure.

FIG. 5 shows a diagram of a node 500 according to an embodiment of the disclosure.

The node 500 is one of a plurality of nodes in a network. The plurality of nodes are connected to each other via ports of the nodes. As shown, node 500 comprises a memory 510 and a first synchronization source selection unit 520 The memory 510 is configured to memorize states of each port of the node in the tree. The first synchronization source selection unit is configured to select a port, referred as first port below, to receive a first synchronization source (such as, Sync-E synchronization source) associated with a first synchronization protocol (such as, Sync-E protocol) based on states of the ports. Accordingly, an automatic selection of the first synchronization source is enabled in the network. At least one tree is formed among nodes in the network according to a second synchronization protocol (such as IEEE 1588v2 protocol). The tree formed according to the second synchronization protocol will not form a loop among the nodes. Accordingly, the first synchronization source selected according to the disclosure will not form a loop in the network.

As shown in FIG. 5, the node 500 may further comprise a timing loop detection unit 530 which is configured to detect a timing loop regarding the first synchronization source. A user of the node may manually configure a port different from the selected port to receive the first synchronization source, and thus a timing loop may occur in the network. Accordingly, the timing loop detection unit 500 is configured to operate after manual operations from the user. If a timing loop is detected by the timing loop detection unit 530, the synchronization source selection unit 520 is configured to select a new port as the first port to receive the first synchronization source based on the states of its ports. The timing loop is thus broken.

It should be noted that the node 500 of FIG. 5 may include more or fewer elements than shown, in various arrangements, and the scope of the claimed subject matter is not limited in this respect.

The foregoing description of implementations provides illustration and description, but is not intended to be exhaustive or to limit the invention to the precise form disclosed. Modifications and variations are possible in light of the above teachings, or may be acquired from practice of the invention.

Aspects of the present invention may also be implemented in methods and/or computer program products. Accordingly, the invention may be embodied in hardware and/or in hardware/software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. The actual software code or specialized control hardware used to implement embodiments described herein is not limiting of the invention. Thus, the operation and behaviour of the aspects are described without reference to the specific software code—it being understood that those skilled in the art will be able to design software and control hardware to implement the aspects based on the description herein.

Furthermore, certain portions of the invention may be implemented as "logic" that performs one or more functions. This logic may include hardware, such as an application specific integrated circuit or field programmable gate array or a combination of hardware and software.

Pseudo Code Example

A pseudo code example according to the embodiment of the disclosure is given below. It is noted that the example is given for illustration only and by no way limits the disclosure.

```
/*****************************************************************
I Idea architecture
001    // First step: SyncPort and PTPPort definition, Enable the Announce function.
018    // Second step: Tree-structured module generated.
033    // Third step: SyncEPort Definition, Enable SyncE function.
054    // Fourth step: Select T0/T4 Sync Source; Check SyncE Timing loop, because user-
```

```
configure is also accepted for SyncE flexible configuration.
085      // Fifth step: Reform the Tree if topology changed.
II Idea Premises:
-Premise: The SyncE can be implemented on the 100M/1000M/10G Ethernet port
-Premise: The PTP function is not so much cost on CPU, or can occupy several cores
when the System is multi-core CPU
-Premise: The PTP function is with higher process priority, not occupied by others
-Premise: The PTP function is with higher process priority and not effect to the others
-Premise: It is recommended to use the combination of the PTP(Time/Phase)GM and the
SyncE(Frequency)PRC
-Premise: The PTP tree is the optimized path for the SyncE, if the SyncE do not use the
same "optimized" path, there should be warning shown up
-Premise: The ESMC extension format for checking the timing loop is implemented
-Premise: It is better to add the domain number into the ESMC extension format as
indicated in C13. However, this is not forced.
III Idea requirements:
1. More HW resources:
      -More PTPPort put into use, more PTP dataset needs to be maintained;
2. Switching time cost of Tree reformed need to be under control;
3. In order to break the timing loop, and select a new SyncE source automatically, a new
timer "Timingloop" is created, the threshold value need more discussion.
**********************************************************************/
001      // First step: SyncPort and PTPPort definition, Enable the Announce function
002      // "All the Ethernet ports" is used for the auto-configure, "All the Ethernet ports"
can be changed to the selected ports
003      // Premise: the PTP function is not so much cost on CPU, or can occupy several
cores when the System is multi-core CPU
004      // Premise: the PTP function is with higher process priority, not occupied by
others
005      // Premise: the PTP function with higher priority, and not effect to the others
006 A1. The SyncPort contained All the Ethernet ports in the node.
007 A2. The LAG ports are considered to be the new Ethernet port.
008 A3. The LAG ports are listed in the SyncPort and the PTPPort.
009 A4. The LAG member ports are still listed in the SyncPort, while the LAG member
ports are not listed in the PTPPort.
010 A5. The PTPPort contained All the Ethernet ports in the node. A subset to the
SyncPort.
011 A6. Enable All the PTPPort with "Announce" function, the "Announce" is worked on
the L2 or L3, or use the OSSP compliant with the G.8275.1 draft version.
012 A7. There will be Master-Slave negotiated as the result of A6
013 A8. The SyncPort will take the role of "Master" or "Slave" following the A7
014 A9. The LAG member ports in SyncPort will take the role of "Master" or "Slave"
inheriting the LAG port in PTPPort or SyncPort
015 A10. The state machine follows the IEEE1588v2
016 A11. The G.8265.1 works under the Slave Only mode is considered as the "Slave".
017
018      // Second step: Tree-structured module generated
019      // Premise: It is recommended to use the combination of the
PTP(Time/Phase)GM and the SyncE(Frequency)PRC
020      // Premise: The PTP tree is the optimized path for the SyncE, if the SyncE do not
use the same "optimized" path, there should be warning shown up
021 B1. There can be several trees existed in the same topology in the same time with
different domains.
022 B2. There should be only one slave port in the same domain in the same node.
023 B3. PTP and SyncE can be put into different domains.
024 B4. For the SyncE domain, as indicated in C13, if the domain selected between the
two nodes are not the same, warning shown up, but T0 procedure continue. This is not
forced
025 B5. For the PTP domain, there can only be one domain active for the Tree.
026 B6. Hybrid Mode can be implemented in different domains between PTP and SyncE.
027 B7. PTP can select domainA(only one domain can be active among the trees of
PTP), while SyncE can select domainA, domainB,domainC..., but maybe with warning as
B4.
028 B8. As indicated in B7, the implementation of Warning/Alarm shown up following the
Fourth step.
029 B9. Timing loop Alarm shown only when the SyncE forms to be a loop, and
SyncEPort in T0 "failed", trigger a new action to select the current T0 SyncSource.
030 B10. As indicated in B9, Timing loop will trigger a new action of selecting the current
T0 SyncSource following the section D1, Fourth step.
031 B11. The switching time cost should under the Hold-Off time obeying G.781.
032
033      // Third step: SyncEPort Definition, Enable SyncE function
034      // "All the Ethernet ports" is used for the auto-configure, "All the Ethernet ports
that support SyncE" can be changed to the selected ports
035      // Premise: the SyncE can be implemented on the 100M/1000M/10G Ethernet
port
036      // Premise: It is better to add the domain number into the ESMC extension format
as indicated in C13. However, this is not forced.
```

```
037        // Check Existed timing loop to avoid the manually timing loop configured by
users
038        // Absolute frequency offset guarding can be put into use also, this is a plus
039 C1. Enable All the Ethernet ports that support SyncE with SyncE function.
040 C2. The SyncEPort is a logical port that contained all the SyncE supported Ethernet
port.
041 C3. The SyncEPort is a subset of the SyncPort.
042 C4. The LAG ports are not considered to be included in the SyncEPort.
043 C5. The SyncEPort should maintain a "SyncETable", which contained All the
Ethernet ports that support SyncE, the "SyncETable" works as the G.781.
044 C6. SyncEPort take the role "Master" or "Slave" inherited from the SyncPort, and
maybe play different role in different domains.
045 C7. If several Ethernet ports among different domains in the SyncEPort are all "slave"
status, there should be only one physical Ethernet port selected to be the current SyncE
clock source.
046 C8. The best QL received Ethernet port with the state "Slave" should be selected as
the current SyncEPort's Sync source. The QL is following the G.781.
047 C9. Check the result of C8, If the best QL contained several Ethernet ports, the one
with higher Priority should be selected as the current SyncEPort's Sync source.
048 C10. As indicated in the C9, the default Priority value of each Ethernet port is
generated as this: LocalPriority = absolutevalue((the domain of the current Ethernet port) −
(the domain of the PTPPort)). However, the Local Priority can be manually modified.
049 C11. Check the result of C10, If the best QL/Priority contained several Ethernet ports,
the one in the front Queue should be selected as the current SyncEPort's Sync source.
050 C12. When C8 cannot be fitted, which means there is no Ethernet port stays in
"Slave" state with the ESMC received. Then the ones staying in
"MASTER/PASSIVE/LISTENING/UNCALIBRATED/INITIALIZING/FAULTY/DISABLED/..."
state with the ESMC received, can be added as the current SyncEPort source with
warning as described in D1;
051 C13. C12 indicates a scenario that the SyncEPort selects a SyncE source from
another domain, so it is better that the ESMC contained the domain number, however,
this is not forced.
052 C14. If the current Ethernet port "failed" in "SyncETable", the current source in
SyncEPort should switch to the candidate Ethernet port, following the G.781.
053
054        // Fourth step: Select T0/T4 Sync Source; Check SyncE Timing loop, because
user-configure is also accepted for SyncE flexible configuration.
055        // Premise: the ESMC extension format is implemented
056 D1. Check the SyncEPort status:
057        -D11. Select several domains for SyncEPort;
058        -D12. If one of the Ethernet ports is in "slave" status and with the ESMC
extension format received, the SyncEPort can be procedure with T0 process following the
G.781;
059        -D13. Else If one of the Ethernet ports is in "slave" status but with non-extension
ESMC format received, the SyncEPort can be procedure with T0 process but with
warning;
060        -D14. Else If one of the Ethernet ports link is up, but not in "slave" status, and
there is ESMC extension format received, the SyncEPort can be procedure with T0 also,
but with warning;
061        -D15. Else If one of the Ethernet ports link is up, but not in "slave" status, and
there is ESMC non-extension format received, the SyncEPort can be procedure with T0
also, but with warning;
062        -D16. Else SyncEPort remain "failed" in T0;
063        -D17. Check the timing loop with extension ESMC format, alarm shown up on
each node if timing loop existed.
064        -D18. When D17 happened, the nodes in the timing loop are not required to
switch the current SynEPort's source, only the ones with warnings D14, and triggers to
procedure with the SyncETable processing as C8~C14;
065        -D19. When D18 happened, a New Timer "Timingloop" for recording the timing
loop should be implemented, if the "Timing loop" alarm lasts beyond a threshold value,
the alarm converts to be a Fatal Error, and then all the nodes in the timing loop with this
Fatal Error kick off the current Ethernet port.
066        -D1a. When D17~D19 happened, the SyncEPort "failed" in T0 table and "Out of
Service" in SyncPort as indicated in D3.
067 D2. Check the PTPPort status:
068        -D21. Select only one domain for PTPPort;
069        -D22. Continue with the current IEEE1588v2 procedure;
070        -D23. If the PTPPort's state is "slave", the PTPSyncPort's status is "up", PTPPort
can be procedure with the T0 processing;
071        -D24. Else PTPPort remains "failed" in T0;
072 D3. Check the SyncPort status:
073        -D31. Check the result of D2, if the PTPPort is "slave" and the PTPSyncPort is
"up", then it is "In Service" in SyncPort; Else, "Out of Service" in SyncPort;
074        -D32. Follow the result of D1a;
075        -D33. Check the result of D1, if the current SyncEPort's Syncsource Ethernet is
"slave" and the extension ESMC received, then it is "In Service" in SyncPort;
076        -D34. Check the result of D1, if the current SyncEPort's Syncsource Ethernet is
"slave" but with the non-extension ESMC received, then it is "In Service" in SyncPort with
warning;
```

```
077     -D35. Check the result of D1, if the current SyncEPort's Syncsource Ethernet's
link is "up" and with the extension ESMC received, but not in "slave", then it is "In Service"
in SyncPort with warning;
078     -D36. Check the result of D1, if the current SyncEPort's Syncsource Ethernet's
link is "up" and with the non-extension ESMC received, but not in "slave", then it is "In
Service" in SyncPort with warning;
079     -D37. Check the result of D33~D36, if non of these fitted, the SyncEPort "Out of
Service" in the SyncPort;
080     -D38. Check the result of the above D31~D37, if the PTPPort is "IS" and the
SyncEPort is "IS", then the SyncPort can be procedure with the T0 process as the Hybrid
Mode;
081     -D39. Check the result of the above D31~D37, if the PTPPort is "IS" and the
SyncEPort is "OOS", then the SyncPort can not be procedure with the T0 process as the
Hybrid Mode; only PTPPort is active in the T0;
082     -D3a. Check the result of the above D31~D37, if the PTPPort is "OOS" and the
SyncEPort is "IS", then the SyncPort can not be procedure with the T0 process as the
Hybrid Mode; only SyncEPort is active in the T0;
083     -D3b. Check the result of the above D31~D37, if neither the PTPPort nor the
SyncEPort is "IS", then the SyncPort can not be procedure with the T0 process as the
Hybrid Mode;
084
085         // Fifth step: Reform the Tree if topology changed
086 E1. Topology changed, reform the tree
087 E2. Warning/Alarm shown up if the Fourth Step is not fitted
088 E3. Switching time cost should under the Hold-Off time obeying the G.781
```

In the foregoing pseudo code example, terms "SyncPort" is used to indicate all the Ethernet ports in the node, "PTPPort" is used to indicate the ports of the node that anticipate in forming of a tree according to the 1588v2 protocol and have respective states, and "SyncEPort" is used to indicate the ports that are selected to receive the Sync-E synchronization source according to the present disclosure.

Figure 6:
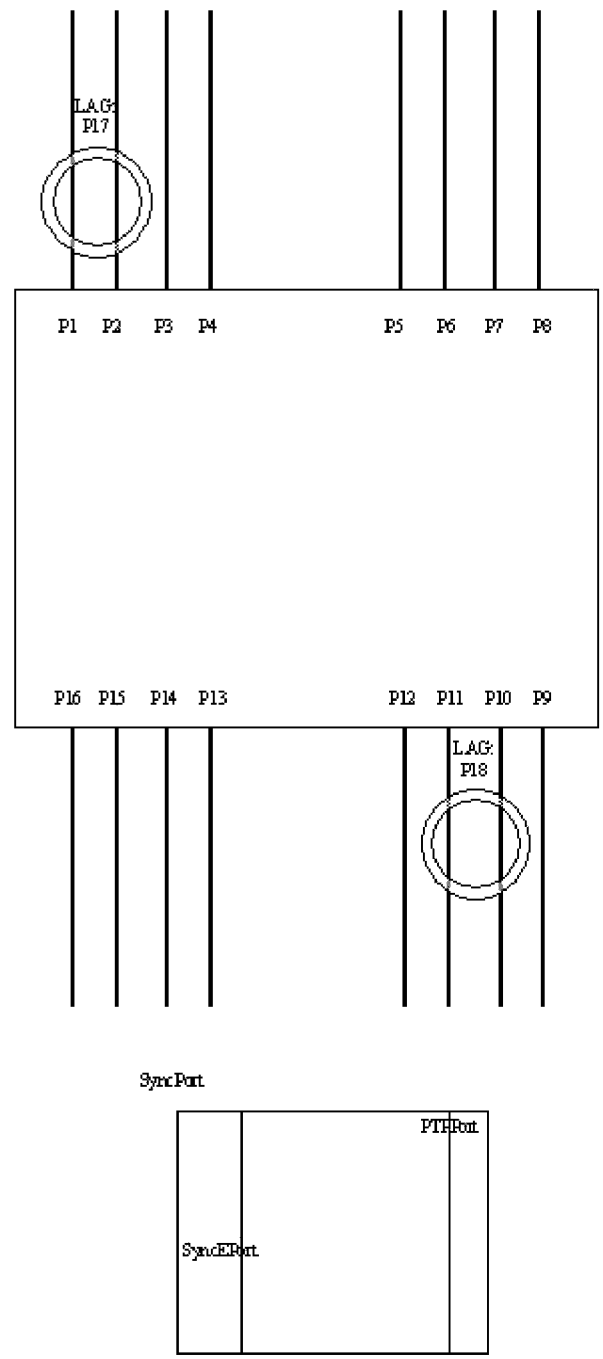
FIG. 6 is a diagram illustrating the definition of the SyncPort, PTP port and SyncEport.

FIG. 6 is a diagram illustrating the definition of the SyncPort, PTP port and SyncEport.

As indicated in FIG. 6, there are 16 physical Ethernet port {P1, P2, ... P15, P16} in the node, and two LAG ports {P17, P18} configured. Suppose that only the P1~P8 supporting SyncE physically.

The definition of the PTPPort according to A2~A5 is: PTPPort={P3, P4, P5, P6, P7, P8, P9, P12, P13, P14, P15, P16, P17, P18}; where each of the selected Ethernet port in PTPPort maintains a state machine. The definition of the SyncPort according to A1~A4 is: SyncPort={P1, P2, P3, ... P15, P16, P17, P18}; where each of the selected Ethernet port in SyncPort gets its state from the PTPPort, the P1 and P2 get from the P17, the P10 and P11 get from the P18. The definition of the SyncEPort according to C1~C6 is: SyncEPort={P1, P2, P3, P4, P5, P6, P7, P8}, where each of the selected Ethernet port in SyncEPort gets its state from the SyncPort.

Figure 7:
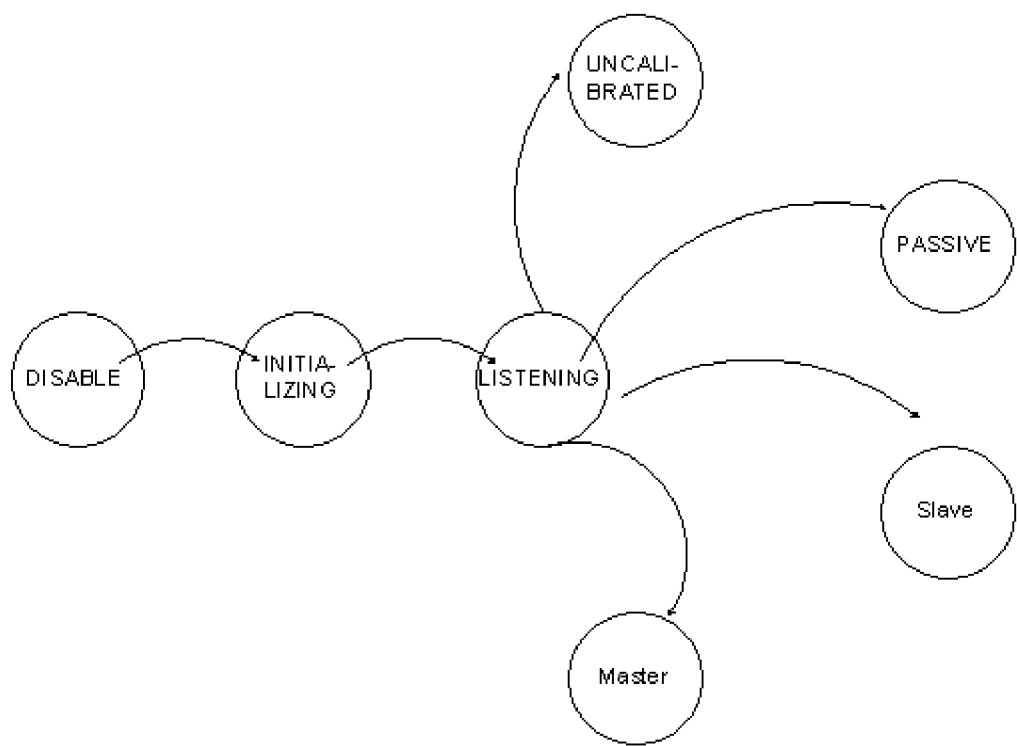
FIG. 7 shows a state machine memorized at a PTPPort.

FIG. 7 shows a state machine memorized at a PTPPort. According to the disclosure, the state machine of the PTPPort is formed according to 1588v2 standard, and thus is completely the same with 1588v2 standard's FIG. 23 and FIG. 24.

Figure 8:
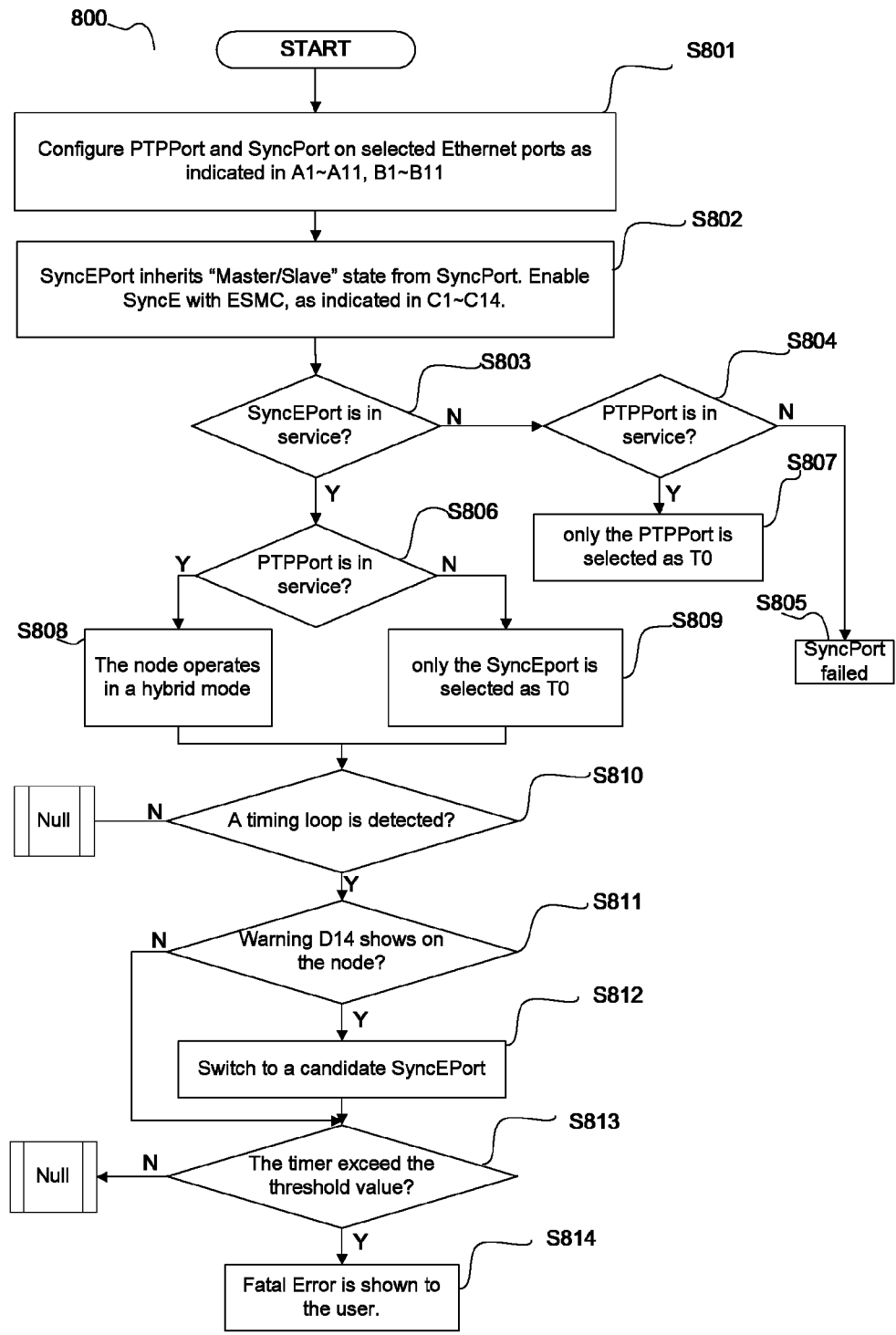
FIG. 8 illustrates a flowchart of a method performed according to the pseudo code example of the disclosure.

FIG. 8 illustrates a flowchart of a method performed according to the pseudo code example of the disclosure.

As shown, at step S801, PTPPorts and SyncPorts are configured on selected Ethernet ports according to the definitions indicated in A1~A11 and B1~B11. Several trees may be established with different domains according to the topology of the nodes in the network. There is only tree active for the same node's PTPPort. Each SyncPort gets its master or slave from PTPPort, as indicated in A1~A11. At step S802, each SyncEPort inherits its master or slave state from SyncPort, and enable Sync-E with ESMC, as indicated in C1~C14. At step S803, it is detected whether the SyncEPort is in service. If the SyncEPort is out of service, the method proceeds to step S804, where it is detected whether the PTPPort is in service. If the PTPPort is in service, the method proceeds to step S807, where only the PTPPort is selected as the synchronization source. If the PTPPort is out of service, the method proceeds to step S805, where SyncPort fails. The node cannot receive its synchronization source, either frequency synchronization source or time synchronization source. If it is detected that the SyncEPort is in service in step S803, the method proceeds to step S806 to detect whether the PTPPort is in service. If the PTPPort is in service, the method proceeds to step S808, where the node operates in a hybrid mode, and the method turns to step S810. If the PTPPort is out of service, the method proceeds to step S809, where only the SyncEPort is selected as the synchronization source, and the method proceeds to step S810. At step S810, it is detected whether there is a timing loop in the network. In order to be compatible with the current protocols and usage, the Ethernet port listed in the SyncEPort not in state "slave" or with no extension ESMC can be selected as the port to receive the Sync-E synchronization source, but a waning should be shown as indicated in D13~D15. If a timing loop is detected at step S810, a timer starts to indicate the timing loop. It is detected whether a warning is shown on the node at step S811. If the node has a warning displayed thereon, it switches the port to a candidate SyncEport to receive the Sync-E synchronization source at step S812, and the method proceeds to step S813. At step S813, it is detected whether the timer exceeds the predetermined threshold. If the timing loop is broken after step S812, the timer is reset. If the timer exceeds the threshold, indicating that the timing loop cannot be broken by selecting an appropriate port, the method proceeds to step S814, where a fatal error is shown to the user.

The embodiments set above gives examples where a port to receive Sync-E synchronization source is selected by applying the 1588v2 protocol. It is obvious to a skilled in the art that the disclosure is not limited to the Sync-E synchronization and 1588v2 protocol. Any kind of frequency synchronization source, either existing or proposed in the future, and any kind of packet synchronization related protocol, either existing or proposed in the future, are applicable in the disclosure. A frequency synchronization source can be selected according to the disclosure by applying a time or phase synchronization related protocol.

Currently, the primary standard for Sync-E comprises:
ITU-T G.8261-Timing and Synchronization aspects in packet network [Reference 3]
ITU-T G.8262-Timing and characteristics of Sync-E Equipment and slave clock [Reference 4]
ITU-T G.8264-Distribution of timing through packet networks [Reference 5]
ITU-T G.781-Synchronization layer functions [Reference 6]
ITU-T G.8265.1-Precision time protocol telecom profile for frequency synchronization [Reference 7]
ITU-T G.8265, "Architecture and requirements for packet based frequency delivery [Reference 8]

The disclosure is applicable to select a port to receive a synchronization source associated with any one of ITU-T G.8261, ITU-T G.8262, ITU-T G.8264, ITU-T G.781, ITU-T G.8265, ITU-T G.8265.1 and others appropriate protocols, by applying a time or phase synchronization related protocol, such as
IEEE 1588 2008-Protocol, IEEE Standard for a Precision Clock Synchronization Protocol for Networked Measurement and Control Systems [Reference 1]
ITU-T G.8271, Time and phase synchronization aspects of packet networks [Reference 9]
ITU-T G.8260, "Definitions and terminology for synchronization in packet networks [Reference 10]

According to the disclosure, the appropriate time reference is selected by applying a protocol where no loop will occur, and thus the selected time reference will not form a loop among nodes in a network. According to the disclosure, a node may select appropriate ports to receive both the frequency synchronization source and the time or phase synchronization source when it works in a hybrid mode, and thus the time reference is more accurate than the case where only one synchronization source is received.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

REFERENCE

[1] IEEE 1588 2008-Protocol, "IEEE Standard for a Precision Clock Synchronization Protocol for Networked Measurement and Control Systems," 2008
[2] "Timing Loop Detection/Avoiding by ESMC Extension and Link Ring Protection Protocols in SyncE Network", http://www.rdjournal.co.uk/rd/free/RD585012.pdf, 4 December, 2012
[3] ITU-T G.8261, "Timing and Synchronization aspects in packet network," April, 2008
[4] ITU-T G.8262, "Timing and characteristics of Sync-E Equipment and slave clock," August, 2007
[5] ITU-T G.8264, "Distribution of timing through packet networks," October, 2008
[6] ITU-T G.781, "Synchronization layer function," November, 2009
[7] ITU-T G.8265.1, "Precision time protocol telecom profile for frequency synchronization," October, 2010
[8] ITU-T G.8265, "Architecture and requirements for packet based frequency delivery," October, 2010
[9] ITU-T G.8271, Time and phase synchronization aspects of packet networks," February, 2012
[10] ITU-T G.8260, "Definitions and terminology for synchronization in packet networks," February, 2012

What is claimed is:

1. A node configured to select a first port to receive a first synchronization source in a system comprising a plurality of nodes, the plurality of nodes being connected to each other via ports of the nodes, the first synchronization source being associated with a first synchronization protocol different from a second synchronization protocol used in the system, the node comprising:
a memory configured to memorize states of each port of the node in a corresponding tree of at least one tree in the system, said at least one tree being formed with ports of the plurality of connected nodes according to the second synchronization protocol, and
a first synchronization source selection unit configured to select the first port to receive the first synchronization source, based on states of the ports of the node.

2. The node according to claim 1, wherein the first synchronization source is a frequency synchronization source.

3. The node according to claim 1, wherein the first synchronization protocol is a packet synchronization related protocol.

4. The node according to claim 1, wherein the second synchronization protocol is a time or phase synchronization related protocol.

5. The node according to claim 1, further comprising:
a timing loop detection unit configured to detect a timing loop regarding the first synchronization source in the system, if a port of the node other than the first port is configured to receive the first synchronization source.

6. The node according to claim 5, wherein the first synchronization source selection unit is configured to select a new port as the first port to receive the first synchronization source based on states of its ports, if the timing loop detection unit detects a timing loop in the system.

7. The node according to claim 1, wherein the first port is in state "slave".

8. The node according to claim 1, wherein each of said at least one tree belongs to a different domain, and each port in each tree has the same domain number as the tree it belongs to.

9. The node according to claim 8, wherein the first synchronization source selection unit is configured to select one of the ports as the first port based on the Quality Level (QL) of multiple candidate first synchronization sources received at the ports and the domain numbers of the ports.

10. The node according to claim 9, wherein, if more than one port has the best QL, the first synchronization source selection unit is configured to select the one whose domain number is closest to one tree of said at least one tree which is active in the system for a second synchronization source, the second synchronization source being associated with the second synchronization protocol.

11. The node according to claim 8, wherein the timing loop detection unit is configured to detect a timing loop by using an extension Ethernet Synchronization Message Channel (ESMC) packet, which contains a domain number of a port which it passes through.

12. A method for selecting a first port of a node to receive a first synchronization source in a system comprising a plurality of nodes, the plurality of nodes being connected to each other via ports of the nodes, the first synchronization source being associated with a first synchronization protocol different from a second synchronization protocol used in the system, the method comprising:
  memorizing states of each port of the node in a corresponding tree of at least one tree in the system, the at least one tree being formed with ports of the plurality of connected nodes according to the second synchronization protocol, and
  selecting the first port to receive the first synchronization source based on states of the ports of the node.

13. The method according to claim 12, wherein the first synchronization source is a frequency synchronization source.

14. The method according to claim 12, wherein the first synchronization protocol is a packet synchronization related protocol.

15. The method according to claim 12, wherein the second synchronization protocol is a time or phase synchronization related protocol.

16. The method according to claim 12, further comprising:
  detecting a timing loop regarding the first synchronization source in the system if a port of the node other than the first port is configured to receive the first synchronization source.

17. The method according to claim 16, further comprising:
  selecting a new port as the first port to receive the first synchronization source based on states of ports of the node if it is detected the timing loop regarding the first synchronization source in the system.

18. The method according to claim 12, wherein the first port is in state "slave".

19. The method according to claim 12, wherein each of said at least one tree belongs to a different domain, and each port in each tree has the same domain number as the tree it belongs to.

20. The method according to claim 19, wherein selecting the first port further comprises:
  selecting one of the ports as the first port based on the Quality Level (QL) of multiple candidate first synchronization sources received at the ports and the domain numbers of the ports.

21. The method according to claim 20, wherein if more than one port has the best QL, the one whose domain number is closest to one tree of said at least one tree is selected as the first port, the one tree being active in the system for a second synchronization source, the second synchronization source being associated with the second synchronization protocol.

22. The method according to claim 19, wherein detecting the timing loop is performed by using an extension Ethernet Synchronization Message Channel (ESMC) packet, which contains a domain number of a port which it passes through.

* * * * *